United States Patent [19]
Speer et al.

[11] Patent Number: 5,529,833
[45] Date of Patent: Jun. 25, 1996

[54] MULTILAYER STRUCTURE FOR A PACKAGE FOR SCAVENGING OXYGEN

[75] Inventors: Drew V. Speer, Columbia; Charles R. Morgan, Brookeville; William P. Roberts, Columbia, all of Md.; Andrew W. VanPutte, Greenville, S.C.

[73] Assignee: W. R. Grace & Co.-Conn., New York, N.Y.

[21] Appl. No.: 276,125

[22] Filed: Jul. 15, 1994

Related U.S. Application Data

[63] Continuation of Ser. No. 955,099, Oct. 19, 1992, Pat. No. 5,350,622, which is a continuation-in-part of Ser. No. 733,901, Jul. 19, 1991, which is a continuation-in-part of Ser. No. 679,419, Apr. 2, 1991, abandoned.

[51] Int. Cl.$^6$ ............................ B32B 27/18; B29D 22/00
[52] U.S. Cl. .................... 428/215; 428/219; 428/323; 428/349; 428/516; 428/921; 428/35.2
[58] Field of Search ....................... 428/215, 219, 428/349, 516, 921, 323

[56] References Cited

U.S. PATENT DOCUMENTS

| 5,021,515 | 6/1991 | Cochran et al. | 428/219 |
| 5,049,624 | 9/1991 | Adams et al. | 428/219 |
| 5,350,622 | 9/1994 | Speer et al. | 428/215 |

FOREIGN PATENT DOCUMENTS 2247431 of 1992 United Kingdom .

*Primary Examiner*—P. C. Sluby
*Attorney, Agent, or Firm*—Valerie E. Looper

[57] ABSTRACT

Products and film structures using the oxygen scavengers, are disclosed. Such products demonstrate enhanced shelf stability of foodstuffs and reduced sensitivity to humidity and temperature changes.

21 Claims, No Drawings

MULTILAYER STRUCTURE FOR A PACKAGE FOR SCAVENGING OXYGEN

This is a continuation of application Ser. No. 955,099, filed Oct. 1, 1992, now U.S. Pat. No. 5,350,622 which is a continuation-in-part of our application U.S. Ser. No. 733,901 filed Jun. 22, 1991, for "Compositions, Articles and Methods for Scavenging Oxygen", which is a continuation-in-part of our application U.S. Ser. No. 679,419, filed Apr. 2, 1991, abandoned, for "Compositions, Articles and Methods for Scavenging Oxygen", incorporated herein by reference in their entirety.

FIELD OF THE INVENTION

The invention generally relates to compositions, articles and methods for scavenging oxygen in environments containing oxygen-sensitive products, particularly food and beverage products. As will be evident from the disclosure below, the term "oxygen scavenger" refers to compositions, articles or the like which consume, deplete or reduce the amount of oxygen from a given environment.

BACKGROUND OF THE INVENTION

It is well known that regulating the exposure of oxygen-sensitive products to oxygen maintains and enhances the quality and "shelf-life" of the product. For instance, by limiting the oxygen exposure of oxygen sensitive food products in a packaging system, the quality of the food product is maintained, and food spoilage is avoided. In addition such packaging also keeps the product in inventory longer, thereby reducing costs incurred from waste and having to restock inventory. In the food packaging industry, several means for regulating oxygen exposure have already been developed. These means include modified atmosphere packaging (MAP) and oxygen barrier film packaging.

One method currently being used is through "active packaging," whereby the package for the food product is modified in some manner to regulate the food product's exposure to oxygen. See Labuza and Breene, "Application of 'Active Packaging' for Improvement of Shelf Life and Nutritional Quality of Fresh and Extended Shelf-Life Foods," *Journal of Food Processing and Preservation*, Vol. 13, pp. 1–69 (1989). The inclusion of oxygen scavengers within the cavity of the package ("headspace") is one form of active packaging. Typically, such oxygen scavengers are in the form of sachets which contain a composition which scavenges the oxygen through oxidation reactions. One sachet contains iron-based compositions which oxidize to their ferric states. Another type of sachet contains unsaturated fatty acid salts on a particulate adsorbent, see U.S. Pat. No. 4,908,151, or a low molecular weight hydrocarbon mixture or a low molecular weight hydrocarbon with a fatty acid salt and optimally, a humidity adjusting agent, see European Patent Application 454,437 A1. Yet another sachet contains metal/polyamide complex. See PCT Application 90/00578.

However, one disadvantage of sachets is the need for additional packaging operations to add the sachet to each package. A further disadvantage arising from the iron-based sachets is that certain atmospheric conditions (e.g., high humidity, low $CO_2$ level) in the package are sometimes required in order for scavenging to occur at an adequate rate.

Another means for regulating the exposure to oxygen involves incorporating an oxygen scavenger into the packaging structure itself. Through the incorporation of the scavenging material in the package itself rather than by addition of a separate scavenger structure (e.g., a sachet) to the package, a more uniform scavenging effect throughout the package is achieved. This may be especially important where there is restricted air flow inside the package. In addition, such incorporation can provide a means of intercepting and scavenging oxygen as it is passing through the walls of the package (herein referred to as an "active oxygen barrier"), thereby maintaining the lowest possible oxygen level throughout the package.

One attempt to prepare an oxygen-scavenging wall involves the incorporation of inorganic powders and/or salts. See European Applications 367,835; 366,254; 367,390; and 370,802. However, incorporation of these powders and/or salts causes degradation of the wall's transparency and mechanical properties such as tear strength. In addition, these compounds can lead to processing difficulties, especially in the fabrication of thin layers such as thin films. Even further, the scavenging rates for walls containing these compounds appear to be unsuitable for many commercial oxygen-scavenging applications, e.g. such as those in which sachets are employed.

The oxygen scavenging systems disclosed in U.S. Pat. No. 5,021,515 issued to Cochran et al. Jun. 4, 1991 and U.S. Pat. No. 5,049,624 issued to Adams et al. Sep. 17, 1991 illustrate another attempt to produce an oxygen-scavenging wall. These patent applications disclose incorporating a metal catalyst-polyamide oxygen scavenging system into the package wall. The rate of oxygen scavenging, however, is too low for the inventors' purpose.

European Application 301,719 (Example 7) illustrates that adding these materials to a high-barrier package containing air produces a package which is not generally suitable for creating an internal oxygen level of less than 0.1% (starting with air) within a period of four weeks or less at room temperature, as is typically required for headspace oxygen scavenging applications. See Mitsubishi Gas Chemical Company, Inc.'s literature titled "AGELESS®-A New Age in Food Preservation" (date unknown).

Further, in regards to the incorporation of the polyamide/catalyst system into the package wall, polyamides are typically incompatible with the thermoplastic polymers, e.g. ethylene-vinyl acetate copolymers and low density polyethylenes, typically used to make flexible package walls. Even further, certain polyamides, which are suitable for rigid structures such as bottles, can make inappropriately stiff structures, when incorporated into flexible packaging walls. Polyamides also incur processing difficulties and higher costs when compared with the costs of thermoplastic polymers typically used to make flexible packaging. Even further, they are sometimes difficult to heat seal. Thus, all of these are factors to consider when selecting materials for packages, especially flexible packages and when selecting systems for reducing oxygen exposure of packaged products.

The oxygen scavengers of the present invention are disclosed in copending U.S. Ser. No. 679,419 filed Apr. 2, 1991, and a method of initiating oxygen scavenging generally is disclosed in U.S. Ser. No. 722,067 filed Jun. 27, 1991. Both applications are incorporated herein by reference as if set forth in full. It has been found that these oxygen scavengers have a demonstrable effect on the shelf stability of certain food products. Further, these materials can be used as a lidstock or incorporated in multilayer packaging materials to produce thin, flexible, transparent films having an oxygen transmission of less than about 1 cc $O_2/(m^2 \cdot atm \cdot day)$, more preferably less than 0.5, and even more preferably, less than 0.05 cc $O_2/(m^2 \cdot atm \cdot day)$. These films are an effective substitute for a 15–40 micrometer layer of aluminum foil in some applications.

It has also been found that these materials have special use in certain applications, where the oxygen scavenger can be used to compensate for another oxygen barrier material's sensitivity to humidity or heat.

Finally, the oxygen scavenging materials are both permeable to other gases and selective. They can be incorporated into generally gas permeable packaging for the purpose of producing an enhanced oxygen barrier while substantially maintaining the overall transmission rates of other gases such as carbon dioxide. Such packaging is especially useful where a product is sensitive to oxygen and also gives off another gas.

SUMMARY OF THE INVENTION

It is an object of the invention to obtain a composition which is effective as an oxygen scavenger and is suitable for incorporating into layers used in articles containing oxygen-sensitive products.

It is a further object to obtain an oxygen scavenging composition which is compatible with the materials typically used to prepare such layers.

It is also an object to obtain compositions for scavenging oxygen which can be used in a flexible layer in a multilayer article containing oxygen-sensitive products.

It is a further object of the invention to provide a novel composition suitable for use in packaging of food and beverage products.

It is thus an even further overall object of the invention to overcome the above-mentioned disadvantages of previously used oxygen-scavenging methods.

The above-mentioned objects are obtained from a novel composition comprising:

(a) an ethylenically unsaturated hydrocarbon and (b) a transition metal catalyst.

When the composition is incorporated into a layer such as a film layer, novel articles for packaging oxygen-sensitive products can be prepared therefrom and thus provide a new method for limiting the exposure of such products to oxygen. The articles used in those methods limit the oxygen exposure by acting as an active oxygen barrier and/or acting as means for scavenging oxygen from within the article.

Such articles include flexible, transparent packaging films which have a transmission of oxygen of less than about 1 cc $O_2/(m^2 \cdot atm \cdot day)$ more preferably less than 0.5, and even more preferably, less than about 0.05 cc $O_2/(m^2 \cdot atm \cdot day)$.

It is a further object of this invention to provide such a packaging film which maintains its oxygen barrier characteristics after exposure to elevated humidity and/or elevated temperature.

It is yet another object of this invention to provide such a film which can enhance the shelf stability of an oxygen-sensitive product.

Further objects and advantages of the present invention will be apparent from the description that follows.

DESCRIPTION OF THE INVENTION

The invention can be used in packaging articles having several forms. Suitable articles include, but are not limited to, rigid containers, flexible bags, or combinations of both. Typical rigid or semi-rigid articles include plastic, paper or cardboard cartons or bottles such as juice containers, soft drink containers, thermoformed trays or cups which have wall thicknesses in the range of 100 to 1000 micrometers. Typical flexible bags include those used to package many food items, and will likely have thicknesses of 5 to 400 micrometers. In addition the walls of such articles often comprise multiple layers of material. This invention can be used in one, some or all of those layers.

Though it may be preferable from the standpoint of packaging convenience and/or scavenging effectiveness to employ the invention as an integral part of the package wall, the invention can also be used as a non-integral packaging component, e.g. coatings, bottle cap liners, adhesive or non-adhesive sheet inserts, sealants or fibrous mat inserts.

Besides packaging articles for food and beverage, packaging for other oxygen-sensitive products can benefit from the invention. Such products would be pharmaceuticals, oxygen sensitive medical products, corrodible metals or products such as electronic devices, etc.

The ethylenically unsaturated hydrocarbon (a) may be either substituted or unsubstituted. As defined herein, an unsubstituted ethylenically unsaturated hydrocarbon is any compound which possesses at least one aliphatic carbon-carbon double bond and comprises 100% by weight carbon and hydrogen. A substituted ethylenically unsaturated hydrocarbon is defined herein as an ethylenically unsaturated hydrocarbon which possesses at least one aliphatic carbon-carbon double bond and comprises about 50%–99% by weight carbon and hydrogen. Preferable substituted or unsubstituted ethylenically unsaturated hydrocarbons are those having two or more ethylenically unsaturated groups per molecule. More preferably, it is a polymeric compound having three or more ethylenically unsaturated groups and a molecular weight equal to or greater than 1,000 weight average molecular weight.

Preferred examples of unsubstituted ethylenically unsaturated hydrocarbons include, but are not limited to, diene polymers such as polyisoprene, (e.g., transpolyisoprene), polybutadiene (especially 1,2-polybutadienes, which are defined as those polybutadienes possessing greater than or equal to 50% 1,2 microstructure), and copolymers thereof, e.g. styrene-butadiene. Such hydrocarbons also include polymeric compounds such as polypentenamer, polyoctenamer, and other polymers prepared by olefin metathesis; diene oligomers such as squalene; and polymers or copolymers derived from dicyclopentadiene, norbornadiene, 5-ethylidene-2-norbornene, or other monomers containing more than one carbon-carbon double bond (conjugated or non-conjugated). These hydrocarbons further include carotenoids such as β-carotene.

Preferred substituted ethylenically unsaturated hydrocarbons include, but are not limited to, those with oxygen-containing moieties, such as esters, carboxylic acids, aldehydes, ethers, ketones, alcohols, peroxides, and/or hydroperoxides. Specific examples of such hydrocarbons include, but are not limited to, condensation polymers such as polyesters derived from monomers containing carbon-carbon double bonds; unsaturated fatty acids such as oleic, ricinoleic, dehydrated ricinoleic, and linoleic acids and derivatives thereof, e.g. esters. Such hydrocarbons also include polymers or copolymers derived from (meth)allyl (meth)acrylates.

The composition used may also comprise a mixture of two or more of the substituted or unsubstituted ethylenically unsaturated hydrocarbons described above.

As will also be evident, ethylenically unsaturated hydrocarbons which are appropriate for forming solid transparent layers at room temperature are preferred for scavenging oxygen in the packaging articles described above. For most applications where transparency is necessary, a layer which allows at least 50% transmission of visible light is preferred.

When making transparent oxygen-scavenging layers according to this invention, 1,2-polybutadiene is especially preferred as component (a). For instance, 1,2-polybutadiene can exhibit transparency, mechanical properties and processing characteristics similar to those of polyethylene. In addition, this polymer is found to retain its transparency and mechanical integrity even after most or all of its oxygen capacity has been consumed, and even when little or no diluent resin is present. Even further, 1,2-polybutadiene exhibits a relatively high oxygen capacity and, once it has begun to scavenge, it exhibits a relatively high scavenging rate as well.

As indicated above, (b) is a transition metal catalyst. While not being bound by any particular theory, suitable metal catalysts are those which can readily interconvert between at least two oxidation states. See Sheldon, R. A.; Kochi, J. K.; "Metal-Catalyzed Oxidations of Organic Compounds" Academic Press, New York 1981.

Preferably, (b) is in the form of a transition metal salt, with the metal selected from the first, second or third transition series of the Periodic Table. Suitable metals include, but are not limited to, manganese II or III, iron II or III, cobalt II or III, nickel II or III, copper I or II, rhodium II, III or IV, and ruthenium. The oxidation state of the metal when introduced is not necessarily that of the active form. The metal is preferably iron, nickel or copper, more preferably manganese and most preferably cobalt. Suitable counterions for the metal include, but are not limited to, chloride, acetate, stearate, palmitate, 2-ethylhexanoate, neodecanoate or naphthenate. Particularly preferable salts include cobalt (II) 2-ethylhexanoate and cobalt (II) neodecanoate. The metal salt may also be an ionomer, in which case a polymeric counterion is employed. Such ionomers are well known in the art.

When making layers, such as film layers, from compositions wherein (a) is a polymeric compound such as polybutadiene, polyisoprene or copolymers thereof or polypentenamer, etc., the layer can be prepared directly from (a). On the other hand, (a) and transition metal catalyst (b) may be further combined with one or more polymeric diluents, such as thermoplastic polymers which are typically used to form film layers in plastic packaging articles. Even in the event (a) is a thermoplastic polymer, e.g. polybutadiene, it is sometimes suitable to include one or more additional polymeric diluents. In the manufacture of certain packaging articles well known thermosets can also be used as the polymeric diluent.

Selecting combinations of diluent and (a) depends on the properties desired. Polymers which can be used as the diluent include, but are not limited to, polyethylene terephthalate (PET), polyethylene, low or very low density polyethylene, ultra-low density polyethylene, linear low density polyethylene, polypropylene, polyvinyl chloride, polystyrene, and ethylene copolymers such as ethylene-vinyl acetate, ethylene-alkyl (meth)acrylates, ethylene-(meth)acrylic acid and ethylene-(meth)acrylic acid ionomers. In rigid articles such as beverage containers PET is often used. See European Application 301,719. Blends of different diluents may also be used. However, as indicated above, the selection of the polymeric diluent largely depends on the article to be manufactured and the end use. Such selection factors are well known in the art.

If a diluent polymer such as a thermoplastic is employed, it should further be selected according to its compatibility with the ethylenically unsaturated hydrocarbon selected for (a). In some instances, the clarity, cleanliness, effectiveness as an oxygen scavenger, barrier properties, mechanical properties and/or texture of the article can be adversely affected by a blend containing a polymer which is incompatible with (a). For instance, it has been found that when (a) is dehydrated castor oil, a less "greasy" film is prepared from a blend with ethylene-acrylic acid copolymer than with ethylene vinyl acetate copolymer.

Further additives may also be included in the composition to impart properties desired for the particular article being manufactured. Such additives include, but are not necessarily limited to, fillers, pigments, dyestuffs, antioxidants, stabilizers, processing aids, plasticizers, fire retardants, anti-fog agents, etc.

The mixing of the components listed above is preferably accomplished by melt-blending at a temperature in the range of 50° C. to 300° C. However alternatives such as the use of a solvent followed by evaporation may also be employed. The blending may immediately precede the formation of the finished article or preform or precede the formation of a feedstock or masterbatch for later use in the production of finished packaging articles. When making film layers or articles from oxygen-scavenging compositions, (co)extrusion, solvent casting, injection molding, stretch blow molding, orientation, thermoforming, extrusion coating, coating and curing, lamination or combinations thereof would typically follow the blending.

The amounts of (a), (b), optional polymeric diluents and additives, vary depending on the article to be manufactured and its end use. These amounts also depend on the desired oxygen scavenging capacity, the desired oxygen scavenging rate, and the particular materials selected.

For instance, the primary function of (a) is to react irreversibly with oxygen during the scavenging process, and the primary function of (b) is to facilitate this process. Thus, to a large extent, the amount of (a) will affect the oxygen capacity of the composition, i.e., affect the amount of oxygen that the composition can consume, and the amount of (b) will affect the rate at which oxygen is consumed. It also thus follows that the amount of (a) is selected in accordance with the scavenging capacity needed for a particular application, and the amount of (b) is selected in accordance with the scavenging rate needed. Typically, the amount of (a) may range from 1 to 99%, preferably from 10 to 99%, by weight of the composition or layer in which both (a) and (b) are present (herein referred to as the "scavenging component" e.g., in a coextruded film, the scavenging component would comprise the particular layer(s) in which (a) and (b) are present together). Typically, the amount of (b) may range from 0.001 to 1% (10 to 10,000 ppm) of the scavenging component, based on the metal content only (excluding ligands, counterions, etc.). In the event the amount of (b) is about 0.5% or less, it follows that (a) and/or the diluent will comprise substantially all of the composition.

If one or more diluent polymers are used, those polymers may comprise, in total, as much as 99% by weight of the scavenging component.

Any further additives employed would normally not comprise more than 10% of the scavenging component, with preferable amounts being less than 5% by weight of the scavenging component.

As mentioned above, the oxygen scavenging composition may be used in a flexible or rigid single layer or multilayer article. The layers comprising the composition may be in several forms. They may be in the form of stock films, including "oriented" or "heat shrinkable" films, which may ultimately be processed as bags, etc. The layers may also be in the form of sheet inserts to be placed in a packaging cavity. In rigid articles such as beverage containers, thermoformed trays or cups, the layer may be within the container's walls. Even further, the layer may also be in the form of a liner placed with or in the container's lid or cap. The layer may even be coated or laminated onto any one of the articles mentioned above.

In multilayered articles, the oxygen scavenging layer may be included with layers such as, but not necessarily limited to, "oxygen barriers", that is, layers of material having an oxygen transmission rate equal to or less than 500 cubic centimeters per square meter ($cc/m^2$) per day per atmosphere at room temperature, i.e. about 25° C. Typical oxygen barriers are poly(ethylene vinyl alcohol) ("EVOH"), polyacrylonitrile, polyvinyl chloride, poly(vinylidene dichloride), polyethylene terephthalate, silica, and polyamides. "EVOH" as used herein is an ethylene vinyl alcohol copolymer having an ethylene content of preferably 32%. Commercially available resins include EVAL EC-F101(EVALCA), Nippon Goshei Soarnol D, DT, and ZL, and Solvay Clarene R. Ethylene content for the EVOH is preferably between about 20% and 40%, and more preferably between about 25% and 35%. An ethylene content of about 32% by weight is most preferred.

The copolymer is alternatively referred to as a hydrolyzed or saponified ethylene vinyl acetate copolymer. Preferably the saponification is carried out to a high degree, that is, greater than 90%.

The polyvinylchloride ("PVC") and poly(vinylidene dichloride) ("PVDC") materials include normally crystalline polymers, both homopolymers and copolymers, containing vinylidene chloride. As copolymerizable materials there can be used vinyl chloride, acrylonitrile, vinyl acetate, ethyl acrylate, ethyl methacrylate and methyl methacrylate. Terpolymers can also be employed, e.g. a terpolymer of vinylidene chloride, dimethyl maleate and vinyl chloride. In general, the vinylidene chloride constituent is at least 50 percent of the material in the polymer, and preferably in the range of 60 to 80 percent, and is a blend of 5–40% suspension polymer and 60–95% emulsion polymer, preferably with an epoxy resin blended therewith in an amount of 2–10%.

An alternate barrier layer can be formed from a latex emulsion coating grade of vinylidene chloride/vinyl chloride having 5–15% vinyl chloride. In a preferred form the coating grade polymer of vinylidene chloride/vinyl chloride is present in an amount of from 5–100% (of total solids) with the remainder being 2–10% epoxy resin and melt extrusion grade material.

The term "polyamide" refers to high molecular weight polymers having amide linkages along the molecular chain, and refers more specifically to synthetic polyamide such as various Nylons such as Nylon 6, 66, 6/12, 6/66 and 6/69, including high density versions and nylon copolymers.

Copolymers of certain materials described above, and metal foil or silica layers, can also be employed.

The additional layers may also include one or more layers which are permeable to oxygen. In one preferred embodiment, especially for flexible packaging for food, the layers include, in order starting from the outside of the package to the innermost layer of the package, (i) an oxygen barrier layer, (ii) a layer comprising the invention, i.e. the scavenging component as defined earlier, and optionally, (iii) an oxygen permeable layer. Control of the oxygen barrier property of (i) allows a means to regulate the scavenging life of the package by limiting the rate of oxygen entry from the outside of the package to the scavenging component (ii), and thus limiting the rate of consumption of scavenging capacity. Control of the oxygen permeability of layer (iii) allows a means to limit the rate of oxygen scavenging for the overall structure independent of the composition of the scavenging component (ii). When outer layer (i) is a suitably high barrier and inner layer (iii) is permeable to oxygen, the package as a whole will scavenge oxygen from the inside of the package.

Another aspect of the invention is that the oxygen scvenger layer (ii) can be placed between two high barrier (i) layers. The life of the film is extended, and also an extremely high oxygen barrier structure is obtained. As a result, a thin, transparent film can be made which is an effective substitute for aluminum foil in some applications. Films made with this symmetrical structure will not scavenge as much oxygen from the interior of the package as the asymmetric films.

Furthermore, layer (iii) can provide a barrier to migration of (a), (b), other additives, or by-products of scavenging into the package interior. Even further, layer (iii) or other additional layers may also improve the heat-sealability, clarity, resistance to blocking and resistance to abuse of the multilayer film.

The sealant layer can be a crosslinkable polyolefin or a homopolymer, copolymer, terpolymer or graft copolymer of an alpha olefin such as propylene, ethylene and 1-butene. For example copolymers of ethylene and propylene having an ethylene content of 3–10% by weight (EPC) are heat sealable. Also, ethylene vinylacetate (EVA) having a vinyl acetate/ethylene weight ratio of 5–20%, preferably 8–12%, may be mentioned. Other useful materials are low density (branched) polyethylene ("LDPE") where the density is about 0.915–0.925, linear low density polyethylene ("LLDPE") where the density is in the range of 0.920 to 0.924, and very low density polyethylene ("VLDPE"), having density below 0.910. Acrylate polymers such as ethylene (meth)acrylic acid "EMAA" ethylene acrylic acid "EAA" as well as ethylene n-butyl acrylate "EnBA", as well as the salts of (meth)acrylic acid copolymers ("Ionomers"), may also be used. In addition, this layer commonly includes antiblock and antifog additives.

A useful subclass of sealant layers are self-weldable layers. These layers will self-weld under mild heat, and are preferably ethylene vinyl acetate copolymers, and more preferably an EVA with about 10–14% vinyl acetate comonomer and acrylate polymers.

The terms "anti-blocking agent" and the like are used herein to describe substances that reduce the tendency of films or sheets of polyolefin film to stick or adhere to each other or to other surfaces when such adhesion is otherwise undesirable. Typical chemicals such as colloidal silica, finely divided silica, clays, silicons, and certain amides and amines are useful in this application. These agents are typically available as concentrates. A preferred range of the concentrate is from about 1% to about 15% by weight of the blend layers. A more preferred range is from about 5% to about 10%. This delivers about 500–20,000 ppm, preferably about 1,000 to 10,000 ppm of the agent itself. Inadequate anti-blocking agent i.e. below about 500 ppm, will result in the film sticking to the forming mandrel or shoe as it is formed into a package, and the film material will not machine well on form-fill-seal equipment. A content above 15% could result in a progressive decrease in seal strength.

Particularly useful are micron-sized silica such as that available from Teknor Apex. This silica is available under the trade designation EPE-8160. Also commercially available is Syloid® from W. R. Grace & Co.-Conn.

Various materials contribute toughness or overall durability to a film structure. These materials often have multiple uses or functions in a film structure. These include ethylene propylene copolymers, various polyethylenes, and ionomers discussed above, with respect to sealant layers. Abuse layers often include antifog and antiblock additives.

The multilayered articles can be prepared using coextrusion, coating and/or lamination. In addition to oxygen barrier and oxygen permeable layers, further layers such as adhesive or tie layers may be adjacent to any of the layers listed above. Compositions suitable for adhesive layers include those well known in the art, such as anhydride functional polyolefins.

Adhesive layers may be made of various polymeric adhesives, especially anhydride grafted polymers, copolymers or terpolymers as well as maleic anhydride and rubber modified polymers such as the Plexar® materials available from Quantum Chemical Corp, and the Bynel® series available from DuPont, and the Tymor series available from, Morton, Inc. These are typically modified polyolefins.

To determine the oxygen scavenging capabilities of the invention, the rate of oxygen scavenging can be calculated by measuring the time elapsed before the article or specific layer(s) thereof depletes a certain amount of oxygen from a sealed container. For instance, a film comprising the scavenging component can be placed in an air-tight, sealed container of a certain oxygen containing atmosphere, e.g. air which typically contains 20.6% oxygen by volume. Then, over a period of time, samples of the atmosphere inside the container are removed to determine the percentage of oxygen remaining.

When an active oxygen barrier is required, a useful scavenging rate can be as low as 0.05 cc oxygen ($O_2$) per gram of (a) in the scavenging component per day in air at 25° C. and at 1 atmosphere pressure. However, the composition of this invention has the capability of rates equal to or greater than 0.5 cc oxygen per gram of (a) per day, thus making it suitable for scavenging oxygen from within a package, as well as suitable for active oxygen barrier applications. The composition is even capable of more preferable rates equal to or greater than 5.0 cc $O_2$ per gram of (a) per day.

Generally, film layers suitable for use as an active oxygen barrier can have a scavenging rate as low as 1 cc oxygen per square meter per day when measured in air at 25° C. and 1 atmosphere pressure. However, a layer of this invention is capable of a scavenging rate greater than 10 cc oxygen per square meter per day, and preferably has an oxygen scavenging rate equal to or greater than about 25 cc, and more preferably has a scavenging rate of 100 cc oxygen per square meter per day under the same conditions, thus making it suitable for scavenging oxygen from within a package, as well as suitable for active oxygen barrier applications. Under different temperature and atmospheric conditions, the scavenging rates of the composition and layers of the invention will be different. Unless otherwise stated, scavenging rates are defined as being at room temperature and in air at one atmosphere pressure because these best represent the conditions under which the invention will be used in many instances.

In an active oxygen barrier application, it is preferable that the combination of oxygen barriers and any oxygen scavenging activity create an overall oxygen transmission rate of less than about 1.0 cubic centimeters, more preferably 0.5 and even more preferably less than 0.1 cc per square meter per day per atmosphere at 25° C. It is also preferable that the oxygen scavenging capacity is such that this transmission rate is not exceeded for at least two days. See European Application 301,719. Another definition of acceptable oxygen scavenging is derived from testing actual packages. In actual use, the scavenging rate requirement will largely depend on the internal atmosphere of the package, the contents of the package and the temperature at which it is stored. In actual use, it has been found that the scavenging rate of the oxygen scavenging article or package should be sufficient to establish an internal oxygen level of less than 0.1% in less than about four weeks. See Mitsubishi literature supra.

In a packaging article according to this invention, the scavenging rate capability will depend primarily on the amount and nature of (a) and (b), and secondarily on the amount and nature of other additives (e.g., diluent polymer, antioxidant, etc.) which are present in the scavenging component, as well as the overall manner in which the package is fabricated, e.g., surface area/volume ratio.

The oxygen scavenging capacity of an article comprising the invention can be measured by determining the amount of oxygen consumed until the article becomes ineffective as a scavenger. The scavenging capacity of the package will depend primarily on the amount and nature of (a) present in the scavenging component.

In actual use, the oxygen scavenging capacity requirement of the article will largely depend on three parameters of each application:

(1) the quantity of oxygen initially present in the package, (2) the rate of oxygen entry into the package in the absence of the scavenging property, and (3) the intended shelf life for the package.

The scavenging capacity of the composition can be as low as 1 cc oxygen per gram, but is preferably at least 10 cc oxygen per gram, and more preferably at least 50 cc oxygen per gram. When such compositions are in a layer, the layer will preferably have an oxygen capacity of at least 250 cc oxygen per square meter per mil thickness and more preferably at least 1200 cc, even more preferable would be 2400 cc, oxygen per square meter per mil thickness.

Other factors may also affect oxygen scavenging and should be considered when selecting compositions for the scavenging. These factors include but are not limited to temperature, relative humidity, and the atmospheric environment in the package. See Examples 9–18.

As illustrated in the Examples, some embodiments of the invention go through an "induction period" before they exhibit oxygen scavenging. It is believed that antioxidants present in commercially available materials used to make the invention increases the induction period. For instance, comparison of Examples 25 and 26; 20 and 28; 21 and 27; and 29 and 30 illustrates increased induction periods. To counter the antioxidant and thus decrease its effect, peroxides can be added. Other methods of countering the antioxidant would include extracting it prior to fabrication or exposure to actinic radiation, optionally with a photoinitiator present. See U.S. Ser. No. 722,067. See Example 25. Even further, materials absent antioxidants could be selected to make the invention.

The oxygen scavenging materials of the present invention are capable of enhancing the performance of known "oxygen barrier" articles.

In one preferred embodiment, a multilayer shrink film is made of (a) heat seal layer, a crosslinked ethylene-vinyl acetate copolymer;

(b) a barrier layer, a vinyl chloride/vinylidine chloride copolymer;

(c) an abuse layer, uncrosslinked ethylene-vinyl acetate copolymer; and (d) an oxygen scavenger.

The location and number of the various layers with respect to one another and their thickness vary depending on the particular application; the oxygen scavenger (d) is preferably blended with or located between the heat seal (a) and barrier (b) or between the barrier (b) and the abuse (c). Further, the oxygen scavenger might be blended into one or more adhesive (tie) layers inserted between the heat seal, barrier and abuse layers.

An asymmetrical structure using a single barrier layer with an oxygen scavenger located between the barrier layer and the interior of the package would be expected to exhibit headspace oxygen scavenging.

In another preferred embodiment, a multilayer film is made of the following layers:

(a) heat seal and/or abuse (optional)

(b) barrier (d) oxygen scavenger layer (b) barrier (a) heat seal and/or abuse (optional)

Various other abuse and adhesive layers may also be included. This configuration, with the oxygen scavenger located between two barrier layers (which may or may not be the same barrier material) exhibits a low rate of headspace scavenging and longer storage lifetime as well as very high oxygen barrier properties.

The barrier layer may be PVDC or ethylene vinyl alcohol (EVOH).

The abuse layer (c) may be polyethylene, EVA, crosslinkable polyolefins, ionomer, or polyamide, together with possible antiblock additives.

Typically the sealant layer is melt extruded as a tubular film, solidified and crosslinked, preferably by electron beam irradiation at a dose of 2–15 megarads. The irradiated tube is passed to a coating die one or more times where the second layer or layers, typically including the scavenger and barrier layers, is melt extruded as a second tubular film, coated on and directly adhered to the irradiated tube forming a two-or more layer tubular film. The two-layer tubular film is passed to a coating die, preferably while still hot, and the last two layers are extruded as a tubular film coated on and directly adhered to the second tubular film forming a 4-or more layer tubular film laminate. The multi-layer tubular film laminate is solidified and the tubing is stretched biaxially (biaxially oriented) to provide a shrink tension of from 200–500 psi and a free shrink of at least 40% at 205° F. The resulting multi-layer structure has a distinct advantage over similar three-layered structures.

A similar three-layered structure, absent any scavenger layer, is disclosed in U.S. Pat. No. 4,278,738, issued to Brax et al. Jul. 14, 1981, which is incorporated herein by reference as if set forth in full. That patent discloses a three-layer structure, which has, in its preferred form, a thickness of about 0.5 to 11 mils, a shrink tension of 200–400 psi, a free shrink of at least 40% at 205° F. and a free shrink of at least 20% at 185° F., an elongation of at least 50%, more preferably 100–125%, and a ball burst impact resistance of at least 25 cm-kg. This structure is disclosed to have an oxygen transmission rate of no more than 25 cc $O_2/(m^2 \cdot day \cdot atm)$ at 21° C., at 0% relative humidity (ASTM D1434); and more preferably no more than 70 cc $O_2/(m^2 \cdot day \cdot atm)$ 0% r.H. (ASTM D1434).

As can be seen in Example 39 below, dramatically lower rates of oxygen transmission can be obtained when the present invention (i.e., a scavenger layer) is added.

Another aspect of the invention is that the oxygen scavenger can be used to selectively reduce the oxygen permeability of a package. This feature can be used to alter, for example, the $CO_2/O_2$ permeability ratio of a package. This feature is especially useful for foods which give off gases but need protection from oxygen. See examples 38 and 39.

The oxygen scavenging materials of the present invention are capable of altering the composition of the gases within the headspace of a package. The resulting advantage is an enhanced shelf life of food products. For example, an oxygen scavenger layer can be easily incorporated in modified atmosphere packaging (MAP). In one embodiment, the oxygen scavenger could be used in the lidstock or sealant liner of a barrier foam tray.

If the oxygen scavenger layer is used in a lidstock for a barrier foam tray, formulation design may include, but not be limited to, coextruded films with the following structures:

A) Sealant/Tie/Scavenging/Tie/Barrier/Tie/Abuse

B) Sealant/Tie/Barrier/Tie/Scavenging/Barrier/Tie/Abuse

C) Sealant/Tie/Scavenging/Tie/Abuse/Barrier/Abuse/Tie/Abuse

D) Sealant/Barrier/Tie/Abuse/Scavenging/Abuse/Barrier Tie/Abuse.

The Sealant layer may be EPC, LLDPE, EVA, LDPE or ionomer with antifog and antiblock additives. The Barrier layer may be EVOH, PVDC, PVC, or polyacrylonitrile. The Abuse layers may be LLDPE, EPC, EVA, LDPE, PET, Nylon or ionomer, preferably with antiblock additives. The layers may be blended or added separately for different types of abuse. For example, an outer layer might be EPC (for abrasion resistance) and an inner abuse layer might be nylon (for heat resistance). Similarly, such materials may be formulated into a sealant liner for a Barrier foam tray. Such liners may include but are not limited to the following:

A) Sealant/Tie/Scavenging/Tie/Barrier/Tie/EVA/Adherent to foam;

B) Sealant/Scavenging/Tie/Barrier/Tie/EVA/Adherent to foam.

The Sealant layer may be EPC, LLDPE, EVA, LDPE or Ionomer, optionally with antiblock. The Barrier layer may be EVOH or PVDC. The Adherent layer may be EVA, EMA, EnBA, EMAA, EAA or styrene-butadiene copolymers, optionally with antiblock.

Also, experimentation may include blending of EVOH or nylon with the Scavenging polymers.

In yet another embodiment, laminated lidstock can be prepared. An example could be the following:

A) Sealant/Tie/Scavenging/Tie/PET Sealant/PVDC/PET

B) Sealant/Scavenging+Tie/PET Sealant/PVDC/PET.

One of ordinary skill in the art will recognize that, in addition to the listed materials, any blended or compounded combinations of those materials may also be used.

The present invention can also be used to reduce the sensitivity of certain packages (i.e. the barrier layers thereof) to temperature and humidity changes.

Certain types of multilayer films are used as alternatives to metal packages such as No. 10 metal cans. These film packages tend to be less expensive, lighter and less bulky during shipment, and easier to dispose of after use than the metal cans. These film packages are disclosed in U.S. Pat. No. 4,753,700 issued to Fant Jun. 28, 1988, the text of which is incorporated herein by reference as if set forth in full.

These film packages are made of a non-shrink multilayer film that has a core layer of an ethylene vinyl alcohol copolymer; two intermediate layers made of a polyamide; two surface layers each made of a blend of linear low density polyethylene and an anti-blocking agent; and in between each of the intermediate layers and surface layers is a tie layer which is a surface layer of adhesive polymeric material.

In one preferred embodiment, the total film thickness is about 4–11 mils, preferably about 5.5 mils.

These films are made into bags and used with form-fill-seal equipment. Sometimes the bags are filled with high acid foods such as tomato paste at near boiling temperatures.

They have good oxygen barrier characteristics; such as an oxygen transmission rate averaging about 0.2 cc $O_2/(m^2.day.atm)$ at 23° C., 0% RH at a total film gauge of about 5 mils.

However, it has been found that the high temperature and humidity of the hot fill process affects the film's oxygen barrier characteristics, allowing some permeation of oxygen. Further, when the bags are stacked together, the high humidity at the bag interfaces can also affect the bag's oxygen permeability. In this context, high humidity is taken to be a relative humidity of over 85% since the bags are filled with aqueous-based-containing food.

The oxygen scavenger of the present invention shows increased activity with increasing temperature, and can be expected to compensate for the increased permeability due to the packaging conditions experienced by the multilayer film. Incorporation of a scavenger layer may be at any position relative to the layers already present, giving a symmetrical or asymmetrical structure.

In order to further illustrate the practice of the present invention and the advantages thereof, the following examples are provided. However, these examples are in no way meant to be limitive, but merely illustrative.

COMPARISON EXAMPLE

A film of poly(ethylene-vinyl acetate) was prepared and tested as follows. A solution of 2.0 g ELVAX® poly(ethylene-vinyl acetate) having 28% by weight vinyl acetate (EVA-28) from Du Pont was prepared in 20 milliliters (Ml) tetrahydrofuran (THF) and 5 Ml toluene with warming. Sufficient NOURY-DRY® cobalt solution from Akzo Chemicals was added to give a loading of 470 ppm. The resulting formulation was solvent cast under nitrogen onto a surface coated with TEFLON® non-stick coating. Afterwards, the dried film was removed and placed in a 125 mL flask which was stoppered with a rubber septum. Oxygen content in the flask was then monitored by removing 4 cc samples with a gastight syringe at various time intervals and analyzing the samples using a MOCON® model LC 700F oxygen analyzer. The gas samples removed were replaced with nitrogen to maintain atmospheric pressure within the flask. The results are summarized below:

| Day | % Oxygen |
| --- | --- |
| 0 | 20.6 |
| 3 | 20.3 |
| 4 | 20.1 |
| 6 | 19.7 |
| 10 | 19.7 |
| 13 | 19.3 |

These results illustrate that no detectable scavenging occurred under the test method employed. It is believed that the observed slight decrease in oxygen level is fully attributable to the sampling procedure, which involves replacement of the sampled air in the flask with pure nitrogen.

EXAMPLE 1

A solution of 2.16 g of trans-poly(isoprene) from Aldrich was prepared in 65 mL of tetrahydrofuran, THF, with warming. The THF used contained between 1000–2000 ppm of peroxides, as measured with EM QUANT® peroxide test strips from EM Science, Inc. Sufficient NOURY-DRY® cobalt solution from Akzo Chemicals was added to achieve a loading of 4,400 ppm of cobalt based on the pure metal. A 3.0 mm thick wet film was then cast from the resulting solution in a nitrogen atmosphere. The cured film was placed in a 125 mL Erlenmeyer flask containing air and was stoppered with a rubber septum. Oxygen levels of the atmosphere in the flask were measured according to the method described in the Comparison Example.

| Time (Days) | % Oxygen |
| --- | --- |
| 0 | 20.6 |
| 1 | 20.3 |
| 4 | 19.8 |
| 7 | 19.1 |
| 11 | 0.60 |
| 13 | 0.25 |
| 15 | 0.15 |
| 19 | 0.08 |

EXAMPLE 2

A solution of 2.0 g of poly(ethylene-vinyl acetate) (28% vinyl acetate), EVA-28, was prepared with warming in 20 mL of THF containing peroxides as described in Example 1 and 5 mL of toluene. Squalene from Aldrich was added to give 15% by weight (total), and sufficient NOURY-DRY® cobalt solution was added to give 500 ppm cobalt (as metal). A 1.6 mm thick wet film was cast, cured and tested as in Example 1.

| Time (Days) | % Oxygen |
| --- | --- |
| 0 | 20.6 |
| 1 | 20.3 |
| 2 | 19.0 |
| 5 | 0.32 |
| 6 | 0.01 |

EXAMPLE 3

A film was prepared and tested as in Example 2, except CASTUNG® 103 GH dehydrated castor oil from Caschem was used in place of squalene. The castor oil was loaded at 15% by weight and the cobalt catalyst at 500 ppm.

| Time (Days) | % Oxygen |
| --- | --- |
| 0 | 20.5 |
| 1 | 0.02 |
| 4 | 0.03 |
| 5 | 0.02 |

EXAMPLE 4

The same materials and methods described in Example 3 were used and repeated except that a catalyst loading of 400 ppm and a dehydrated castor oil loading of 25% by weight were used.

| Time (Days) | % Oxygen |
| --- | --- |
| 0 | 20.6 |
| 1 | 0.04 |
| 2 | 0.01 |
| 3 | 0.00 |

EXAMPLES 5–8

For these examples, the following formulations were prepared in a BRABENDER® mixing chamber. Films were prepared by pressing in a CARVER® heated lab press. The films tested were in the range of 2–4 g and were 8–15 mils thick. The films were sealed in barrier bags, which were inflated with 130 cc of air. The bags were inflated by means of a needle through an adhesive rubber strip, which also allowed the removal of 4 cc gas samples. No allowance was made for the decrease in volume.

The polymers tested were LOTRYL® 3600 ethylene-butyl acrylate having 30% by weight butyl acrylate and 3610 ethylene-methyl acrylate having 29% methyl acrylate from Sartomer-Atochem Co.; PRIMACOR® 5980 ethylene-acrylic acid having 20% acrylic acid from Dow Chemical; and 1,2-polybutadiene from Scientific Polymers Products, Inc. All of the samples tested contained 15% by weight CASTUNG® 103 GH dehydrated castor oil from Caschem Co. and a cobalt (NOURY-DRY® solution) loading of 500 ppm. In the following table, the induction period is the time elapsed in days before the film exhibited oxygen scavenging properties. The time (days) it took for all of the oxygen to be consumed (0.000) and the length of time (days) over which the film was tested are also recorded below.

according to the method described for Examples 5–8. The compositions all contained 500 ppm cobalt from NOURY-DRY® solution, and as indicated below, all samples except those in Examples 17–18, contained ethylene-vinyl acetate, i.e. EVA-9 and EVA-28. Examples 17–18 illustrate films containing LOTRYL® 3610 ethylene-methyl acrylate and ethylene-butyl acrylate. All samples contained either 15% or 25% by weight CASTUNG® 103 GH dehydrated castor oil. The induction period, the time elapsed before all of the oxygen was consumed, and the length of time over which the film was tested were also recorded.

| Example | Polymer | Castor Oil(a) | Co(II)(b) | Induction (days) | Days to 0.000 | Days Running |
|---|---|---|---|---|---|---|
| 5 | Lotryl 3600 | 15% | 500 | 1 | 4 | 63 |
| 6 | Lotryl 3610 | 15% | 500 | 1 | 8 | 64 |
| 7 | Primacor 5980 | 15% | 500 | 1 | c | 28 |
| 8 | 1,2-Polybutadiene | 15% | 500 | 3 | d | 33 |

(a) - percentage by total weight
(b) - in ppm
(c) - oxygen level at 0.43%
(d) - oxygen level at 2.38%

EXAMPLES 9–18

Conditions Affecting Oxygen Scavenging

The atmospheric conditions under which the oxygen scavengers were tested were varied to simulate the packaging of moist and dry products as well as some modified atmosphere packaging (MAP) conditions. See footnotes b and c of the following table. Temperature was varied as well. These tests were conducted with 130 cc of the atmospheres specified in the table below. The examples were prepared

| Example | Polymer | Castor Oil | Variations | Gas | Induction (Days) | Days to 0.000 | Days Running |
|---|---|---|---|---|---|---|---|
| 9 | EVA-9 | 25% | 1 mL H$_2$O | a | 1 | 17 | 30 |
| 10 | EVA-28 | 15% | 1 mL H$_2$O | a | 5 | 25 | 27 |
| 11 | EVA-9 | 25% | 10 gm Dessicant | a | 1 | 6 | 28 |
| 12 | EVA-28 | 15% | 10 gm Dessicant | a | 1 | 11 | 27 |
| 13 | EVA-9 | 15% | 40% RH | b | 1 | 4 | 31 |
| 14 | EVA-28 | 25% | 42% RH | b | 1 | 8 | 32 |
| 15 | EVA-9 | 15% | 40% RH | c | 1 | 4 | 30 |
| 16 | EVA-28 | 25% | 42% RH | c | 3 | 8 | 32 |
| 17 | Lotryl 3610 | 15% | Room Temp. | a | <1 | 8 | 65 |
| 18 | Lotryl 3600$^d$ | 15% | –5° C. | a | <1 | 13 | 65 | a. Air, i.e. 20.6% O$_2$
b. 3.1% O$_2$, Balance N$_2$
c. 0.93% O$_2$, 30.3% CO$_2$ Balance N$_2$
$^d$Compare with Example 5 which illustrates scavenging by 3600 at room temperature.

From the above results, it does not appear that varied humidity levels significantly affect scavenging performance. See Examples 9–12. Further, low oxygen content does not significantly affect scavenging performance. See Examples 13–16. In addition, the presence of carbon dioxide does not affect that performance. See Examples 15 and 16. Comparison of Examples 17 and 18, and Example 5 from the previous table illustrates that scavenging performance is not significantly affected by lower temperatures.

EXAMPLES 19–26

Except for Example 26, films illustrated in these Examples were prepared by solvent casting methods described in Examples 1–4 and tested as illustrated in Examples 5–8. Example 19 illustrates that casting a film using a solvent such as methylene chloride will produce essentially the same results seen in melt blended films. Compare with Examples 9–12.

These Examples also provide support for the belief that antioxidants have an effect on the induction period and that the addition of peroxides can be used to reduce that effect. Example 24 illustrates the effect which 2,6-di-t-butyl-4-methylphenol (BHT) has on the induction period. Compare with Example 23. It is believed that Examples 20–22 illustrate how peroxides reduce the effect of antioxidants because it is believed that the polymers employed in Examples 20–22 contain antioxidants typically used with those polymers. Example 25 illustrates the effect of antioxidant by measuring the induction period of a composition which has had antioxidant extracted. Compare with Example 26.

In Example 21, "c/t" refers to cis/trans.

| Example | Polymer | Castor Oil | Co(II) | Solvent | Induction (Days) | Days to 0.000 | Days Running |
|---------|---------|-----------|--------|---------|------------------|---------------|--------------|
| 19 | EVA-40 | 25% | 500 | $CH_2Cl_2$ | 2 | 8 | 56 |
| 20 | trans-Polyisoprene[a] | 15%[b] | 1000 | THF[c] | 14 | 17 | 58 |
| 21 | c/t-1,4-Polybutadiene | 0% | 1000 | THF[c] | 2 | 5 | 32 |
| 22 | 1,2-Polybutadiene | 0% | 1000 | THF[c] | 1 | 2 | 35 |
| 23 | EVA-28 | 20% | 500 | THF[c] | 1 | 4 | 73 |
| 24 | EVA-40 | 25% | 500 | THF[c] | d | d | 90 |
| 25 | 1,2-Polybutadiene[e] | 0% | 500 | f | <1 | 10 | 16 |
| 26 | 1,2-Polybutadiene[g] | 0% | 500 | h | 28 | 39 | 46 |

[a]scavenging was not noticed when cis-polyisoprone was used; the film resulting from trans-polyisoprene was somewhat brittle and opaque.
[b]squalene was used in place of castor oil.
[c]with peroxides (1000–2000 ppm).
[d]with 0.15% BHT antioxidant; has not scavenged.
[e]RB830 1,2-polybutadiene from Japan Synthetic Rubber which had antioxidant extracted by soxhlet extraction with acetone for 48 hours; this polymer was tested in 390 cc air.
[f]25 mL methylene chloride and 10 mL toluene.
[g]1,2-polybutadiene from Scientific Polymer Products, Inc.; believed to contain antioxidants typically added to such polymers.
[h]Example 26 was melt blended and pressed.

EXAMPLE 27

The following formulation was prepared in a BRABENDER® mixing chamber: 30 g of low density polyethylene from Union Carbide, 10 g of cis-/trans-1,4-polybutadiene from Scientific Polymer Products, Inc. and sufficient NOURY-DRY® solution to make 500 ppm. The formulation was mixed for 15 minutes at 130° C. A film weighing 2–4 g was pressed and tested as in Examples 5–8.

| Time (Days) | Percent Oxygen |
|-------------|----------------|
| 0 | 20.6 |
| 3 | 20.6 |
| 7 | 20.6 |
| 10 | 20.0 |
| 11 | 17.5 |
| 12 | 12.7 |
| 17 | 0.000 |
| 21 | 0.000 |
| 48 | 0.000 |
| 70 | 0.000 |

EXAMPLE 28

A film weighing 2–4 g and having the following formulation was prepared and tested as described in Example 27: 35.9 g low density polyethylene, 8.9 g trans-polyisoprene, and sufficient NOURY-DRY® solution to have 500 ppm cobalt.

| Time (Days) | Percent Oxygen |
|-------------|----------------|
| 0 | 20.6 |
| 4 | 20.6 |
| 14 | 20.4 |
| 21 | 20.4 |
| 28 | 18.5 |
| 35 | 1.66 |
| 39 | 0.000 |
| 59 | 0.000 |

EXAMPLE 29

To a 50 mL beaker was added 2.06 g of ethylene-vinyl acetate EVA-28 (28% vinyl acetate) and 20 mL of THF containing peroxides. With warming, a homogeneous solution was obtained. To the solution was added 0.517 of CASTUNG® 103 GH dehydrated castor oil from Caschem, and a sufficient amount of manganese carboxylate solution from Mooney Chemical to make 500 ppm manganese relative to the total weight of the combined solids. A film having a 1.6 mm wet thickness was then cast under a nitrogen atmosphere. The cured film was sealed in a barrier bag containing 130 cc of air and the oxygen content thereof was monitored periodically as described in the Examples above.

| Day | % Oxygen |
|---|---|
| 0 | 20.6 |
| 1 | 4.9 |
| 2 | 0.58 |
| 3 | 0.000 |
| 35 | 0.000 |

EXAMPLE 30

To a 50 mL beaker was added 2.08 g of EVA-40 ethylene-vinyl acetate from Polysciences Inc. and 25 mL of methylene chloride. With warming a homogeneous solution was obtained. To the solution was also added 0.096 g of CAS-TUNG® 103 GH castor oil and a sufficient manganese carboxylate solution from Mooney Chemical to make 500 ppm manganese relative to the total weight. A film having a wet thickness of 1.6 mm was then cast as described in Example 29. The cured film was sealed in a barrier bag with 130 cc of air, with the oxygen content thereof measured as described in the above Examples.

| Day | % Oxygen |
|---|---|
| 0 | 20.6 |
| 1 | 20.5 |
| 7 | 20.0 |
| 13 | 19.5 |
| 15 | 7.0 |
| 18 | 0.000 |
| 31 | 0.000 |

EXAMPLE 31

To a 50 mL beaker was added 2.07 g of 1,2-polybutadiene, which had been soxhlet extracted as in Example 25, along with 20 mL of methylene chloride and 13 mL of toluene. The mixture was warmed until a homogeneous solution was obtained. Sufficient manganese carboxylate from Mooney Chemical was added to give 500 ppm Mn (as metal). A 1.6 mm thick (wet) film was then cast under a nitrogen atmosphere. The cured film was placed in a barrier bag inflated with 390 cc of air. Headspace oxygen level was monitored as described above.

| Time (Days) | % Oxygen |
|---|---|
| 0 | 20.6 |
| 1 | 20.6 |
| 8 | 20.6 |
| 12 | 4.8 |
| 13 | 2.8 |
| 14 | 1.12 |
| 16 | 0.013 |
| 20 | 0.000 |
| 26 | 0.000 |

EXAMPLE 32

A masterbatch containing cobalt was prepared by a continuous compounding and a pelletizing operation. Thus, a dry blend of poly(ethylene vinylacetate), vinylacetate 9% (EVA-9), containing 2.3% by weight pellets of TEN-CEM® cobalt (22.5% cobalt by weight) catalyst from Mooney Chemicals was placed in the hopper of a BRABENDER® counter-rotating, intermeshing, twin screw extruder, equipped with a strand-die. The extruder was maintained at 120° C., with the die at 110° C. The resulting strand was fed through a water bath to cool and was dried with an air knife. The strand was then fed into a pelletizer.

EXAMPLE 33

A 2–4 g pressed film of the following formulation was prepared as described in Example 27: 26.0 g low density polyethylene, 10.0 g of poly(styrenebutadiene) (23% styrene) from Scientific Polymer Products, and 4 g of the masterbatch prepared according to Example 32. The film was tested as described in Examples 5–8, except that 390 cc of air was used.

| Time (Days) | % Oxygen |
|---|---|
| 0 | 20.6 |
| 3 | 19.7 |
| 4 | 18.7 |
| 5 | 16.8 |
| 7 | 12.3 |
| 11 | 5.9 |
| 14 | 3.3 |
| 17 | 2.11 |
| 19 | 1.89 |
| 21 | 1.11 |
| 24 | 0.79 |
| 27 | 0.53 |
| 31 | 0.38 |

While the invention has been described with preferred embodiments, it is to be understood that variations and modifications may be resorted to as will be apparent to those skilled in the art. Such variations and modifications are to be considered within the purview and the scope of the claims appended hereto.

EXAMPLES 34–37

Mold Inhibition in Baked Goods

In this example, two different photoinitiators are used to initiate the oxidation reaction of the film samples and to show how scavenging film incorporating an oxygen scavenger could be used in practical application to preserve the quality of foods.

Materials and Methods:

The procedure involved exposing materials to UV light, converting the materials into pouches, and packaging bread samples in the pouches. A controlled quantity of air was introduced into the pouches and the subsequent reduction in oxygen content was monitored. All of the materials tested were 1,2-polybutadiene ("PBD")/poly(ethylene-vinyl acetate) ("EVA") coextrusions which were then laminated to PVDC coated PET. The structures were sealant to skin-PBD/EVA/PVDC/PET at mil thicknesses of 1.5/1.0/0.5(PVDC/PET combined), respectively. The treatments were as follows;

34 - PBD with no photoinitiator

35 - PBD with Benzophenone

36 - PBD with Benzophenone and Ethylene Carbon Monoxide

37 - PBD with Ethylene Carbon Monoxide

All material were exposed to ultraviolet light for 5 minutes at 3.2 Mw/cm$^2$. The exposure was directly against the PBD surface. The materials were made into pouches with the PBD surface oriented to the inside. A single slice of Branola® brand bread was placed in each of the pouches which were then vacuumized and sealed. A volume of 400 cc of air was re-introduced into each pouch using a hypodermic needle attached to a length of tygon tubing with an in line flow regulator valve. The samples were stored at approximately 21° C. under fluorescent lighting. Oxygen concentrations within the pouches were determined using gas chromatography and the presence of spoilage organisms (mold) was determined visually.

Results:

The Table below shows the oxygen concentration readings taken at days 2 and 9. Mold growth was observed on samples as indicated by day 6 of the test. All of the pouches made of materials containing benzophenone were significantly deoxygenated while those containing only ethylene carbon monoxide or no initiator at all displayed no capacity to absorb oxygen. The oxygen concentration readings in the 1.0–1.5% range were called into question due to the lack of mold growth on the samples. In this test, the only condition which would exclude mold growth would be the total lack of oxygen. An attempt was made to verify the readings using an Illinois Instruments oxygen analyzer. All of the samples measuring in the 1.0–1.5% range on the GC were found to be <20 ppm on the oxygen analyzer. This discrepancy in readings at low oxygen concentrations has been observed in the past although the cause is yet to be determined. It is, however, reasonable to assume that those samples which read in the 1% range at the second day measurement were actually fully deoxygenated by this time.

The average internal surface area of the pouches was 1168 cm$^2$ (0.1168 m$^2$). The total volume of oxygen scavenged during the initial 48 hour period was 83.6 cc. Given that there were 1.5 mils of PBD in the structures, the rate of scavenging per mil of PBD was at least 239 cc O$_2$/(m$^2$.mil.day). The actual rate was probably far greater because the packages were fully deoxygenated for some period of time prior to when the first reading was taken.

The results of this test show that the oxygen scavenging capability of PBD/Cobalt/Benzophenone systems can be triggered by relatively low levels of irradiation. Additionally, the system has sufficient oxygen absorption capability to make it feasible for use not only as a total barrier material but also as a means of deoxygenating the internal atmosphere of packages when stored at room temperature.

Oxygen Levels Within Scavenging Packages After
2 and 9 Days Storage at 21° C.
Oxygen Concentration

| Treatment | Rep | 2 Days | 9 Days[1] | Visible Mold Growth (Y/N) |
|---|---|---|---|---|
| 34 | 1 | 20.9 | 8.4 | y |
| | 2 | 20.9 | 15.0 | Y |
| | 3 | 20.7 | 16.0 | Y |
| 35 | 1 | 1.4 | 1.0 | N |
| | 2 | 1.4 | 1.1 | N |
| | 3 | 1.6 | 1.3 | N |
| 36 | 1 | 9.1 | 3.1[2] | Y |
| | 2 | 1.1 | 1.1 | N |
| | 3 | 1.5 | 1.2 | N |
| 37 | 1 | 20.8 | 0.8 | Y |
| | 2 | 20.9 | 0.9 | Y |
| | 3 | 20.6 | 0.9 | Y |

[1] Treatments 34 and 37 exhibited abundant mold growth by Day 9. The metabolic processes of the mold were responsible for converting the oxygen to carbon dioxide in a 1:1 molar ratio, thereby reducing the oxygen content in the package.
[2] A leaking package.
[3] Actual oxygen concentration believed to be below 0.1% (see text of example)

EXAMPLES 38–39

A multilayer shrink barrier structure was prepared by a double pass extrusion coating process. The inner (heat seal) polyolefin layer was extruded and electron-beam irradiated. Then the first coating pass deposited the oxygen scavenging layer. A second pass deposited the poly(vinylidene dichloride) barrier layer and the outer polyolefin abuse layers. The tubing was then biaxially oriented about 13 to 1, giving 1.4–1.5 mil of polyolefin between the interior of the tube, and the scavenging layer, about 0.55 mil of scavenging layer, and about 0.2 mil barrier layer in the final structure. The scavenging layer consisted of 60% EPDM (Vistalon 3708, Exxon), 30% polyoctenamer (Vestenamer 6213, Hüls), and 10% cobalt/benzophenone masterbatch.

GAS TRANSMISSION DATA

A section of the film was cut into four 4"×4" sections. Two sections were irradiated five minutes on each side with the Amergraph unit as described above, while the two other sections were left unirradiated. Samples of irradiated and unirradiated film were each tested for O$_2$ permeability using a MOCON Ox-transmission 200 apparatus, and CO$_2$ permeability using a MOCON Permatransmission-C200 apparatus. All samples were tested at 23° C. Oxygen transmission was measured immediately using pure O$_2$ at 0% RH, and CO$_2$ transmission was measured using pure CO$_2$ at 0% RH. The data shown in the Table below have units of cc(gas)/(m$^2$.d.atm).

| Sample | O$_2$ Trans. cc O$_2$/m$^2$ · d · atm | CO$_2$ Trans. cc O$_2$/m$^2$ · d · atm | CO$_2$/O$_2$ Ratio |
|---|---|---|---|
| unirradiated film - 38 | 24.4 | 123 | 5.04 |
| UV irradiated film - 39 | 1.08 | 97.6 | 90.3 |

The CO$_2$/O$_2$ transmission ratio of most packaging polymers is between about 1–8, and Example 38 gives a typical value of about 5. A CO$_2$/O$_2$ ratio of about 10 would be desirable, for example, in the packaging of a gassing cheese. This should allow CO$_2$ to escape and prevent ballooning of the package, yet inhibit mold growth by preventing oxygen entry.

As seen in Example 39, these data clearly show that the CO$_2$/O$_2$ transmission ratio of a multilayer structure can be increased by at least a factor of 18 through the oxygen scavenging effect, producing in this example a ratio of over 90.

What is claimed is:

1. A multilayer structure for a package comprising (a) a oxygen barrier layer or layers having an oxygen transmission rate less than or equal to 500 cc/(m$^2$.atm.day) at 25° C., and (b) an oxygen scavenging layer or layers comprising an oxygen scavenging system consisting essentially of an ethylenically unsaturated hydrocarbon and a transition metal catalyst having a rate of oxygen scavenging in the presence or absence of (a) which is at least 5 cc oxygen per square meter per day at 25° C., and wherein the oxygen scavenging layer or layers include an additive selected from the group consisting of one or more polymeric diluents, fillers, pigments, dyestuffs, antioxidants, stabilizers, processing aids, plasticizers, fire retardants, antifog agents and mixtures thereof, and wherein the multilayer structure has a thickness of about 5 to 1000 micrometers, and has an oxygen transmission of less than 0.5 cc O$_2$/(m$^2$.day.atm).

2. The structure of claim 1 further comprising a layer or layers selected from the group consisting of polymers and copolymers of ethylene and propylene, acrylate polymers and copolymers, salts of (meth)acrylic acid copolymers, and mixtures thereof, having an oxygen transmission rate of greater than 500 cc $O_2/(m^2.atm.day)$ at 25° C.

3. The structure of claim 1 further comprising a second oxygen barrier layer or layers having an oxygen transmission rate less than or equal to 500 cc $O_2/(m^2.atm.day)$ at 25° C.

4. The structure of claim 3, wherein the oxygen scavenger layer or layers (b) is located between the first and second oxygen barrier layers.

5. The structure of either claim 2, 3 or 4 wherein the barrier layer or layers (a) is selected from the group consisting of poly(ethylene vinyl alcohol), polyacrylonitrile, polymers and copolymers of vinylidene chloride, polyethylene terephthalate, metal foil, silica, polyamides, and mixtures thereof.

6. The structure of either claim 2, 3 or 4 further comprising one or more heat sealable layers.

7. The structure of either claim 2, 3 or 4, further comprising one or more abuse layers.

8. The structure of claim 2, 3 or 4, further comprising one or more adhesive layers.

9. The structure of claim 2, 3 or 4, further comprising a self-weldable layer.

10. The structure of claim 1, wherein the transmission ratio of a non-scavenged gas to oxygen is at least 10.

11. The structure of claim 10 wherein the non-scavenged gas is carbon dioxide.

12. The structure of claim 5 further comprising a heat sealable layer.

13. The structure of claim 5 further comprising one or more abuse layers.

14. The structure of claim 5 further comprising one or more adhesive layers.

15. The structure of claim 5 further comprising one or more self-weldable layers.

16. The structure of claim 6 further comprising one or more abuse layers.

17. The structure of claim 6 further comprising one or more adhesive layers.

18. The structure of claim 6 further comprising a self-weldable layer.

19. The structure of claim 7 further comprising one or more adhesive layers.

20. The structure of claim 7 further comprising a self-weldable layer.

21. The multilayer structure of claim 1, wherein the oxygen scavenging system includes a photoinitiator.

* * * * *